United States Patent [19]

Gargos

[11] Patent Number: 4,481,002

[45] Date of Patent: Nov. 6, 1984

[54] BOAT POWERED BY SEA WAVES

[76] Inventor: Gary Gargos, 355 W. Windsor Rd., Glendale, Calif. 91204

[21] Appl. No.: 434,343

[22] Filed: Dec. 14, 1982

[51] Int. Cl.³ .............................................. B63H 19/02
[52] U.S. Cl. ......................................... 440/9; 440/18; 440/10
[58] Field of Search .................. 440/9, 10, 38, 18, 13; 417/331, 330, 332, 534, 535, 536

[56] References Cited

U.S. PATENT DOCUMENTS

| | | | |
|---|---|---|---|
| 60,471 | 12/1866 | Cahoon | 440/9 |
| 2,048,339 | 7/1936 | Kagfas | 440/9 |
| 3,479,674 | 11/1969 | Beymer | 440/38 |
| 4,076,464 | 2/1978 | Pinney | 417/332 |
| 4,118,932 | 10/1978 | Sivill | 417/332 |
| 4,125,346 | 11/1978 | Pickle | 417/332 |
| 4,334,839 | 6/1982 | Flagg | 417/536 |

*Primary Examiner*—Trygve M. Blix
*Assistant Examiner*—Patrick W. Young
*Attorney, Agent, or Firm*—Lyon & Lyon

[57] ABSTRACT

A boat having an external float pivotally fixed to the boat. Through linkage, the motion of the float relative to the boat resulting from wave motion drives a dual cylinder pump. The pump admits water from the body of water in which the boat is suspended and pressurizes that water for direction aft as a means for propulsion.

1 Claim, 2 Drawing Figures

BOAT POWERED BY SEA WAVES

BACKGROUND OF THE INVENTION

The field of the present invention is propulsion systems for boats.

Recent attention has been directed to the use of energy existing in the waves of the ocean and other bodies of water. In spite of this vast source of energy, relatively little has been done to harness this power for useful work.

Means of conveyance on bodies of water such as the ocean have generally included human propulsion, wind propulsion and power propulsion through the conversion of combustibles and the like into useful drives. Such means for propulsion generally include one or more disadvantages. Sails and human power require relatively constant attention and work. The use of fossil fuels, nuclear fuel and the like tend to create pollutants, require significant capital expenditure and require expensive fuels.

SUMMARY OF THE INVENTION

The present invention is directed to a propulsion system for a boat harnessing the energy of available wave action. To this end, a float is associated with a boat in such a way that the relative motion resulting from wave action is harnessed. A pump arrangement is employed for creating a thrust of water to propel the boat.

Accordingly, it is an object of the present invention to provide a boat propulsion employing sea wave energy. Other and further objects and advantages will appear hereinafter.

DETAILED DESCRIPTION OF THE PREFERRED EMBODIMENT

Figure 1:
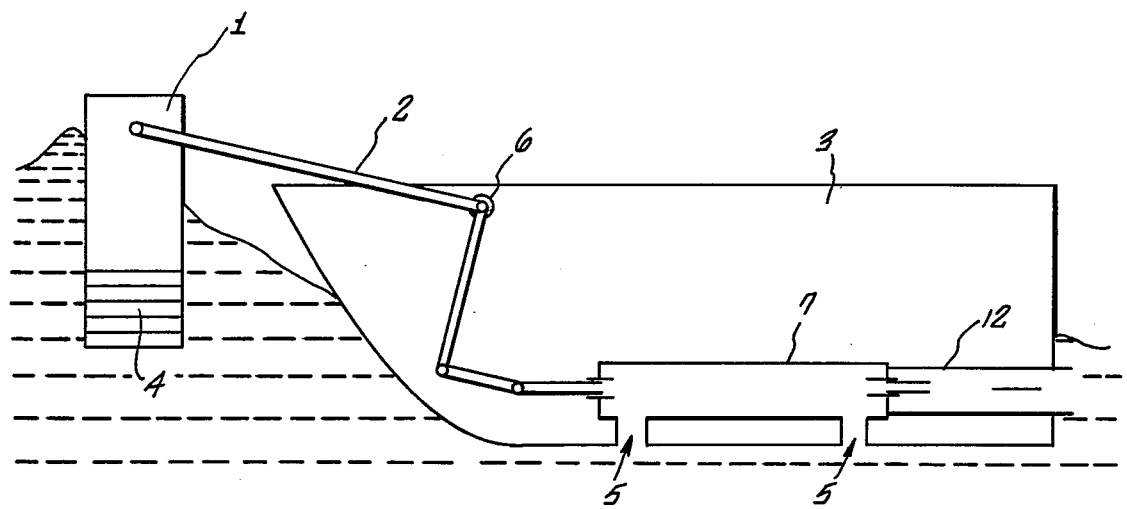
FIG. 1 is a schematic side elevation of a boat employing the present invention.
Figure 2:
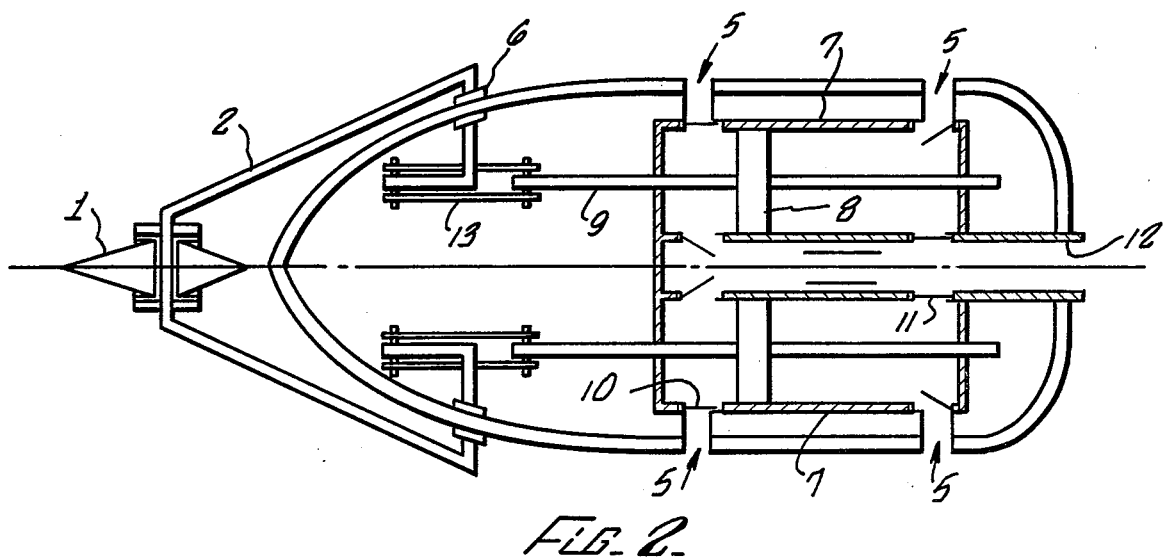
FIG. 2 is a schematic plan view of the boat of FIG. 1.

Turning in detail to the drawings, FIG. 1 illustrates a boat including a boat hull 3 positioned in the water. Associated with the boat hull 3 is a float 1. As can be seen in the Figures, the float 1 is free to ride up and down in the waves. The float 1 includes a member 2 which is pivotally mounted to the hull 3 at pivot 6. Appropriate weight may be added to either the float 1 (No. 4) or to the hull 3 to generate the appropriate masses for maximum efficiency and acceptable bouyancy.

A propulsion system is illustrated for propelling the boat forward. The propulsion system includes dual cylinders 7 with pistons 8 slidably positioned therein. The pistons 8 are mounted on shafts 9 slidably extending through the end walls of the cylinders 7. Inlets 5 direct water into the cylinders 7. Check valves 10 actuate responsive to the flow to control flow through the inlets 5. Check valves 11 direct flow to a central passageway 12 which discharges at the rear of the hull 3. As the pistons 8 move back and forth in the cylinder 7, flow is either drawn in or forced out through the check valves 10 and 11 such that flow eventually exists through the outlet at the rear of the hull 3. In this way, the boat may be powered forwardly through the waves.

Connecting the propulsion system to the float is a linkage means. This linkage is designed to transmit the relative motion between the float and the hull to the rods 9 of the pumping apparatus. To this end, the members 2 extend to pinned links 13 which are also coupled with the rods 9. As the float 1 moves up and down, the linkage arrangement causes the pistons 8 to move within the cylinder 7. Consequently, the wave action results in flow from the outlet at the rear of the hull 3.

Thus, a propulsion system is disclosed which employs the available wave energy for moving a boat forward in a body of water. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A boat comprising
    a hull;
    a float external to said hull, substantially smaller than said hull and pivotally linked to said hull such that said float may ride on the surface of the water substantially independently of said hull;
    a propulsion system in said hull including a pump having an inlet to the water and an outlet aft relative to said hull, said propulsion system including two cylinders, pistons in said cylinders, an outlet passage directed aft between said cylinders and in communication therewith and multiple inlets from the water through said hull to said cylinders, positioned outwardly of said cylinders, and check valves between said inlets and said cylinders and between said cylinders and said outlet passage, said pistons being double acting; and
    linkage means for coupling said float to said pump and constructed and arranged to transmit relative motion between said float and said hull to said pump.

* * * * *